United States Patent [19]

Kobayashi et al.

[11] Patent Number: 5,786,678
[45] Date of Patent: Jul. 28, 1998

[54] METHOD AND APPARATUS FOR AUTOMATICALLY ADJUSTING A GAIN OF A SERVOMECHANISM

[75] Inventors: Seiichi Kobayashi; Ichiro Miura, both of Gunma, Japan

[73] Assignee: NSK Ltd., Tokyo, Japan

[21] Appl. No.: 757,870

[22] Filed: Nov. 27, 1996

[30] Foreign Application Priority Data

Nov. 27, 1995 [JP] Japan ................. 7-329406

[51] Int. Cl.⁶ ................................ B25J 15/02
[52] U.S. Cl. ............................. 318/677; 318/619
[58] Field of Search .......................... 318/560, 561, 318/563, 565, 566, 619, 671, 677

[56] References Cited

U.S. PATENT DOCUMENTS

| | | | |
|---|---|---|---|
| 4,697,127 | 9/1987 | Stich et al. | 318/561 |
| 5,006,770 | 4/1991 | Sakamoto et al. | 318/561 |
| 5,637,969 | 6/1997 | Kato et al. | 318/432 |

OTHER PUBLICATIONS

NSK Technical Journal, No. 649 (1991), pp. 37–44, Japan.
NSK Technical Journal, No. 653 (1992), pp. 42–49, Japan.
NSK Technical Journal, No. 655 (1993), pp. 53–60, Japan.

*Primary Examiner*—Bentsu Ro
*Attorney, Agent, or Firm*—Sughrue, Mion, Zinn, Macpeak & Seas, PLLC

[57] ABSTRACT

In a servomechanism which includes a motor and performs positioning control and velocity control, based on a response of the motor when a step command is supplied in a condition where a load is applied to the motor, the value of the load is estimated, and the servo-gain of the servomechanism is automatically set in accordance with the estimated load value. Load inertia of the servomechanism is automatically calculated, an optimum gain is automatically set based on the calculation result, and a test operation is performed, so that a time period required for the adjustment can be shortened.

2 Claims, 8 Drawing Sheets

METHOD AND APPARATUS FOR AUTOMATICALLY ADJUSTING A GAIN OF A SERVOMECHANISM

BACKGROUND OF THE INVENTION

The present invention relates to a method and an apparatus for automatically adjusting a servo-gain for a system in which a positioning control and a velocity control are performed by a servomechanism, and particularly to a method and an apparatus for automatically adjusting a gain of a servomechanism which includes a direct drive motor.

In conventional gain adjustment for a servomechanism including a rotary motor, a load moment of inertia [kgm$^2$] is first measured or calculated. In the case of a linear motor, a load mass [kg] is measured or calculated (step S1). Hereinafter, a load moment of inertia of a rotation motor and a load mass of a linear motor are generally referred to simply as "load inertia." Next, based on the thus-obtained load inertia, three gain parameters (a position loop gain, a velocity loop gain, and an integral gain) are set while referring to a gain setting table which is previously determined in an instruction manual or the like (step S2). Thereafter, an actual run is performed for verification. If satisfactory characteristics are not obtained, the three gains are individually adjusted (step S3).

However, the above-described conventional adjustment involves the following problems. In some cases, the calculation of the load inertia in step S1 is too difficult to perform. It sometimes takes a very long time period to realize optimum gain adjustment for adjusting the three gains in step S3. The limits of gain adjustments are not easily known. In estimation of a load inertia on the basis of a step response, when the allowable load inertia of the motor is in a wide range such as 0 to about 1,000 times in the case of the rotor inertia alone, also the time constant is varied by about 1,000 times. Thus, it is difficult to measure the time constant.

SUMMARY OF THE INVENTION

The present invention has been conducted in view of conventional problems. It is an object of the invention to provide a method and an apparatus for automatically adjusting a gain of a servomechanism in which the calculation of the load inertia in the first step is automatically performed, and three optimum gains are automatically set from a calculation result, thereby completing the adjustment of the three gains without performing difficult calculations manually and without reviewing an instruction manual and the like, and in which, when further adjustment is to be performed in accordance with a test operation, it is sufficient to perform the adjustment of only one parameter, and it is possible to adjust the gain up to the limitation in a short time period.

It is another object of the invention to provide a method and an apparatus for automatically adjusting a gain of a servomechanism in which the load inertia is calculated by measuring the time constant based on a step response; in a case where the load of a motor is larger than the rotor inertia alone, the velocity control gain is automatically adjusted in an appropriate range (the time constant is in the range of about 25 to 50 milliseconds) before the measurement of the time constant, and then the estimation is performed; the measurement of the time constant is performed until the velocity output reaches 63% of a command from 10% of the command; and the time constant is calculated from the data of the measurement, thereby allowing the estimation to be performed with good accuracy and with a reduced influence of the friction of the motor.

The objects of the invention are achieved by a method of automatically adjusting a gain of a servomechanism which includes a motor and performs a positioning control and a velocity control, in which the method estimates a value of the load based on a response of the motor when a step command is supplied in a condition where a load is applied to the motor, and a servo-gain of the servomechanism is automatically set in accordance with the estimated load value.

In an apparatus for automatically adjusting a gain of a servomechanism which drives a motor and performs a positioning control and a velocity control, the objects of the invention are achieved by the apparatus which includes: a driving unit for supplying a step command to the motor in a condition where a load is applied to the motor, to thereby drive the motor; an estimating unit for estimating the load based on a velocity output of the motor; and a gain setting device for setting a servo-gain of the servomechanism in accordance with an load value estimated by the estimating unit.

According to the present invention, a command is supplied to a servomechanism from a motor driving circuit in a condition where a load is applied to a motor. The response is measured by a motor driving circuit, so that load inertia is automatically calculated, and appropriate gain adjustment is automatically completed. The gain adjustment is performed so as to assure a margin of stability in order that the gain adjustment can accommodate an estimation error of the load inertia and a load object which has a low load rigidity of some extent. In a case where further gain adjustment (fine adjustment) is required as a result of a test operation conducted by a user or the like, thereafter, a position loop gain, a velocity loop gain, and an integral gain are not individually adjusted, and instead only a servo-gain (SG) which is additionally set is adjusted. Thus, the three gains are automatically adjusted in the driving circuit, so that the gains can be adjusted up to the limiting values in a short time period. That is, while the user or the like actually performs the positioning of the servomechanism after the automatic adjustment, conditions which suite purposes intended by the user such as that a time period for the positioning is shortened can be realized by adjusting only the servo-gain.

The present invention is particularly effective in a servomechanism including a direct drive motor (Trademark "MEGATORQUE MOTOR") which is developed by the applicant of the present application. The direct drive motor is a motor which includes a dual stator, an annular rotor and a high resolution feedback sensor, operated as a brushless DC motor. In particular, the feedback sensor is a rotating Variable-Reluctance type multi pole resolver. The direct drive motor can perform positioning at a high speed and with high accuracy. In order to attain the performance, however, it is required to appropriately adjust the servo-gain in accordance with the load inertia. The direct drive motor is described in detail in NSK Technical Journal, No. 649 (1991), pp. 37–44, No. 653 (1992), pp. 42–49, and No. 655 (1993), pp. 53–60. The allowable load of the direct drive motor is about 1,000 times as large as the rotor inertia, that is, in a wide range as compared with a DC/AC servomotor, and has a wide adjustment range. Conventionally, therefore, the adjustment is very difficult, so that different adjusted values are obtained depending on persons who perform the adjustment, and it takes a long time period to perform the adjustment. According to the invention, the gain adjustment can be automatically performed in a short time period even in such a case.

BRIEF DESCRIPTION OF THE DRAWINGS

FIGS. 14A, 14B, 14C are diagrams showing results of positioning according to the invention while comparing the positioning result with a conventional example, in which FIG. 14A shows a result of the conventional example, FIG. 14B shows a result after the automatic adjustment, and FIG. 14C shows a result after fine adjustment by a servo-gain SG.

DETAILED DESCRIPTION OF THE PREFERRED EMBODIMENTS

Preferred embodiments of the present invention will be described with reference to the accompanying drawings.

Figure 1:
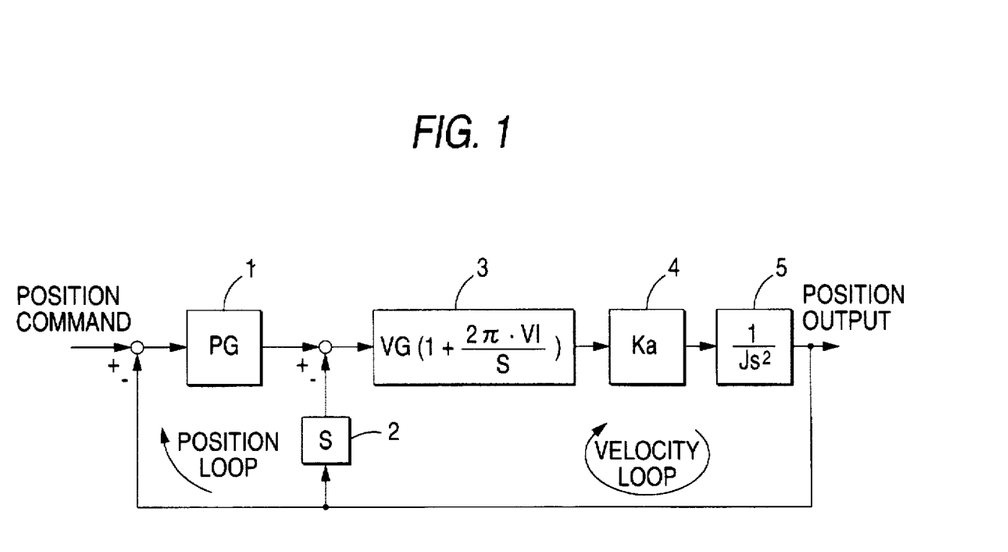
FIG. 1 is a block diagram of a position control system showing a servomechanism of the present invention.

FIG. 1 shows a diagram of a position control block including a position gain 1, a velocity detector 2, a velocity gain and integrator 3, an amplifier 4, and a motor 5. Referring to a block diagram of the position control shown in FIG. 1, an automatic gain setting function for a position control gain PG, a velocity control gain VG, and an integral gain VI will be described. In the figures, the symbol "s" denotes the Laplace operator. In the adjusting method according to the invention, the following three steps A to C are conducted.

Estimation of Load Inertia (Step A)

Figure 2:
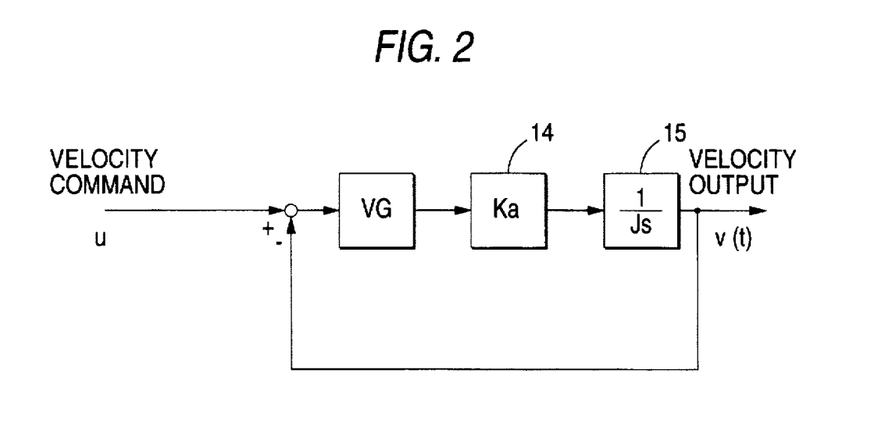
FIG. 2 is a block diagram of a velocity control system used in inertia estimation according to the invention.

As general estimating methods, there are model reference adaptive control methods and self tuning control methods. The present invention adopts off-line estimation based on a time constant measurement in response to a step input. It is assumed that the inertia $J_L$ of a load applied to a motor 15 (a direct drive motor) and the rotor inertia $J_M$ of the motor 15 are combined so as to obtain the load inertia J ($=J_L+J_M$). In order to estimate the load inertia J, the velocity control (proportional control) is performed by the performed by the servomechanism as shown in FIG. 2. By measuring a velocity step command u and a velocity output v(t) of the motor 15, the load inertia J is estimated.

Generally, in the velocity control system shown in FIG. 2, when the velocity step command u is supplied, the velocity output v(t) of the motor is expressed as in Expression 1.

$$V(t) = u \left\{ 1 - \exp\left( -\frac{VG \cdot Ka \cdot t}{J} \right) \right\} \quad (1)$$

where Ka is Motor torque constant (a constant which is known for each used motor); and t is time period.

When a time period (time constant) τ required for the motor velocity output v(t) to reach 63% of the velocity step command u is measured, the time constant τ can be related to the load inertia as shown in Expression 2:

$$\tau = J/(VG \cdot Ka) \quad (2)$$

The load inertia J is obtained as follows:

$$J = VG \cdot Ka \cdot \tau \quad (3)$$

where the velocity control gain VG and the gain (torque constant) Ka of an amplifier 14 are known in advance.

Figure 3:
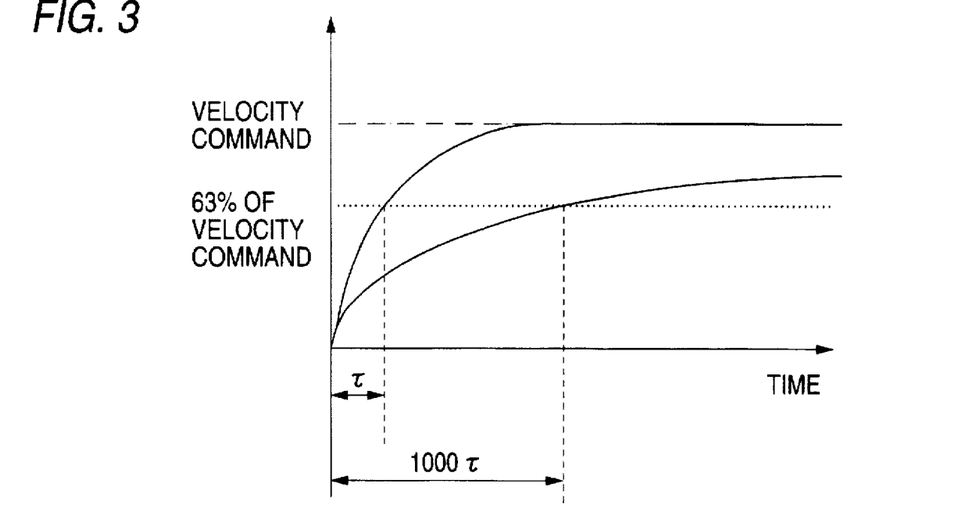
FIG. 3 is a diagram illustrating the velocity step response in the invention.

If the load inertia J is increased by a factor of 1,000, also the time constant τ is increased 1,000 times as seen from in Expression 2 (see FIG. 3). If the velocity control gain is fixed, also the time constant τ is varied about 1,000 times as shown in FIG. 3, with the result that it is difficult to accurately estimate the load inertia J because of various problems such as influence of friction, accuracy of the calculation in the driving circuit, and resolution of the position detector. In the case of the direct drive motor, the allowable load inertia is about 1,000 times or less as large as the rotor inertia $J_M$.

According to the present invention, the velocity control gain VG is automatically adjusted so that the time constant τ of the servomechanism is in an appropriate range (for example, 25 to 50 milliseconds). In accordance with the automatically adjusted velocity control gain VG, the velocity step command u is adjusted in a range where the internal data at the measurement is not saturated. In place of the time period from a time when the velocity is 0 to that when the velocity reaches 63% of the velocity step command u, the time period from a time when the velocity is increased to a certain value (for example, a velocity of 10% of the velocity step command u) to that when the velocity reaches 63% of the velocity step command u is measured. From the measurement data, the time constant τ is calculated, and the load inertia J is estimated.

Figure 4:
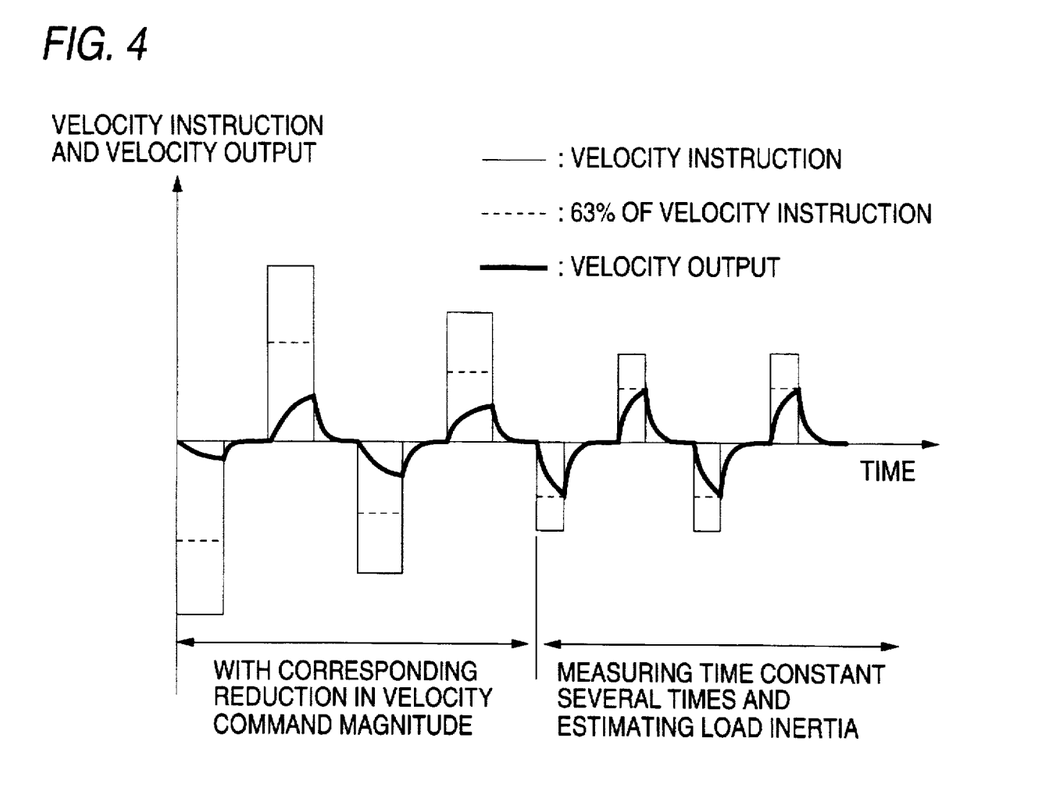
FIG. 4 is a diagram showing an operation example of a motor in automatic gain adjustment according to the invention.

FIG. 4 shows the manner of estimating the load inertia J by automatically adjusting the velocity control gain VG. First, the velocity control gain VG is automatically increased until the time constant τ is reduced to some extent (equal to or less than 50 milliseconds). Then, the time constant τ is measured several times, and the load inertia J is estimated. In this case, in order to reduce the rotation amount of the motor during the estimation (equal to or less than 10 degrees), the magnitude of the velocity step command u is changed in accordance with the velocity gain. In this case, the minimum possible load inertia J is the rotor inertia alone, and hence the value of the velocity control gain VG at which the time constant τ is 25 to 50 milliseconds under this load is used as an initial value. The velocity-step command u is then applied. If the time constant τ is equal to or larger than 50 milliseconds, the velocity control gain VG is doubled, and the time constant τ is then measured again. Until the time constant τ becomes equal to or lower than 50 milliseconds, the operation of doubling the velocity control gain VG is continued in the same way. When the velocity control gain VG is doubled, the time constant τ is ½ according to Expression 2. The velocity control gain VG is increased up to a value at which the time constant τ is 50 milliseconds under the allowable motor load. If the time constant τ is still larger than 50 milliseconds, it is determined that the estimation is erroneous. According to this procedure, it is possible to, when the load is in the range of the allowable motor load, automatically obtain a value of the velocity control gain VG at which the time constant τ is 25 to 50 milliseconds.

Figure 5:
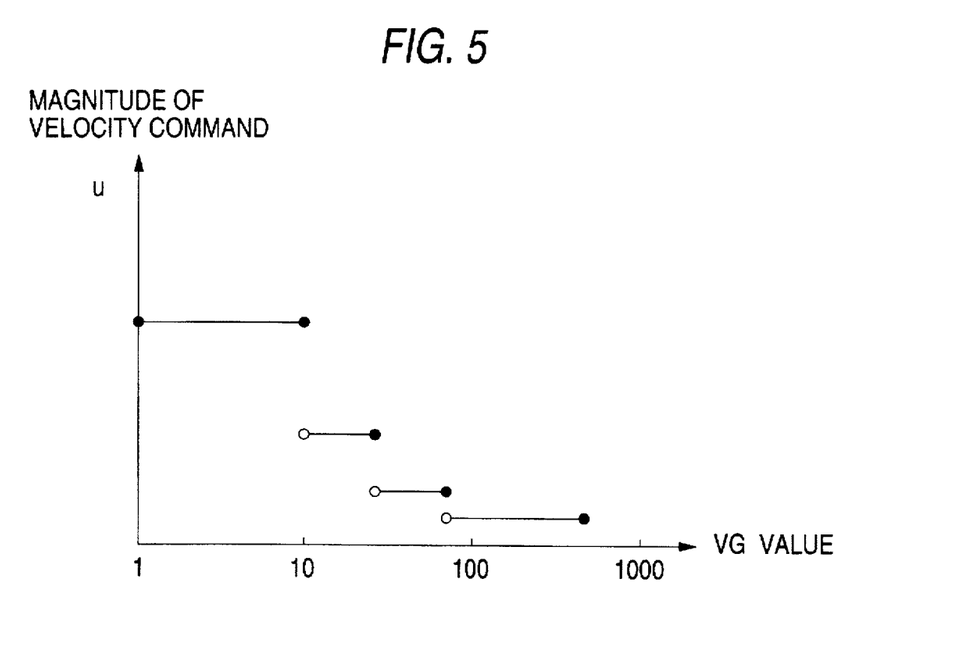
FIG. 5 is a diagram showing relationships between the magnitude of the velocity command and the velocity control gain in the inertia estimation according to the invention.

The relationship between the load inertia J and the time constant τ is not affected by the magnitude of the velocity step command u as seen from Expression 2. To assure calculation accuracy in the estimation of J, however, it is important to use a velocity step command u which avoids difficulties. In particular, an exceedingly small value of u leads to difficulties with friction and calculation round-off error and an exceedingly large value of u leads to difficulties with actuator and calculation saturation. Accordingly, the velocity step command u is increased in a range where saturation is not caused in the driving circuit. The saturation in the driving circuit includes saturation of an output (a torque command) of the velocity control gain VG. The value of the velocity control gain VG is varied by the above-described automatic adjusting operation. Therefore, the velocity step command u is also changed as shown in FIG. 5 in accordance with the variation of the velocity control gain VG. As the value of the velocity control gain VG is increased, the velocity step command u is reduced, so as to prevent the internal saturation, thereby producing an input which can be accurately measured. In order to reduce the position output range during the estimation, the sign of the velocity step command u is sequentially switched over in such a manner that a positive step is followed by a negative step (see FIG. 4).

Figure 6:
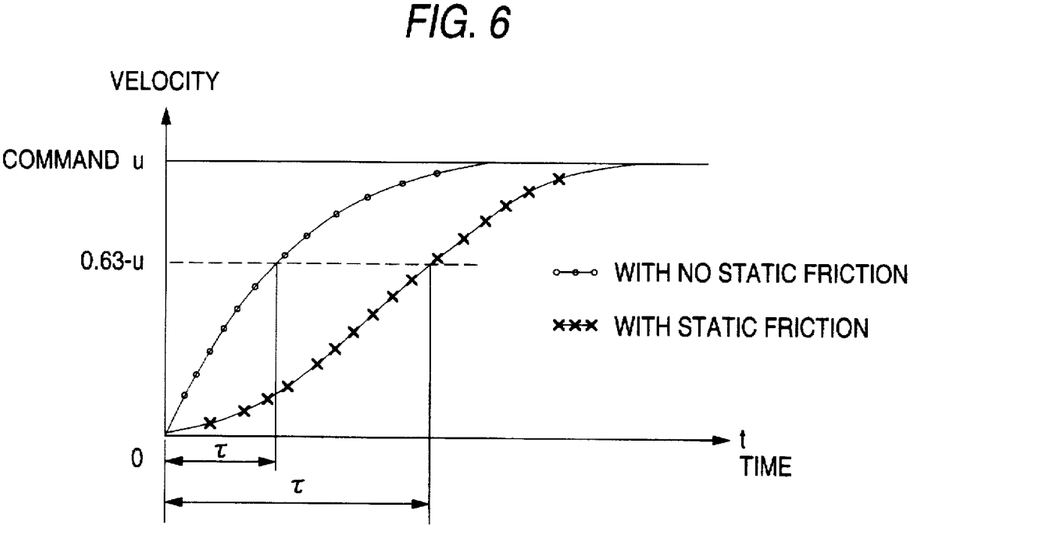
FIG. 6 is a diagram showing an example of a step response influenced by static friction.

As for the calculation of the time constant τ, as shown in FIG. 6, if the static friction is large, the time constant (a time period required for the motor velocity to reach 63% from 0 of the velocity command) τ is varied. Hence, the influence of the static friction should be eliminated. As a method of elimination, the time period required for the motor velocity to reach 63% from 10% of the velocity command is measured, and the time constant τ is calculated from the measurement data in the following manner, thereby solving the problem. Specifically, when a time period required for the motor velocity to reach 10% of the velocity step command u is indicated as $t_1$, Expression 1 can be written as follows:

$$u \times 0.1 = u \left\{ 1 - \exp\left( -\frac{VG \cdot Ka}{J} t_1 \right) \right\} \quad (4)$$

The time period $t_1$ is obtained as follows:

$$t_1 = 0.10536 \ldots \times J/(VG \cdot Ka) = 0.10536 \ldots \times \tau \quad (5)$$

Accordingly, a time period $t_2$ required for the motor velocity to reach 63% from 10% of the velocity step command u is obtained as follows:

$$t_2 = (1 - 0.10536 \ldots) \tau = 0.89464 \ldots \times \tau \quad (6)$$

Therefore, the time constant τ is calculated from the time period $t_2$:

$$\tau = 1.117768 \ldots \times t_2 \quad (7)$$

In the embodiment, the time constant τ is calculated from the time period $t_2$ required for the motor velocity to reach 63% from 10% of the velocity step command u. Alternatively, the time constant may be similarly calculated from another time period.

Process of Determining the Gains (PG, VG, and VI) from an Estimated Value of the Load Inertia J (Step B)

Figure 7:
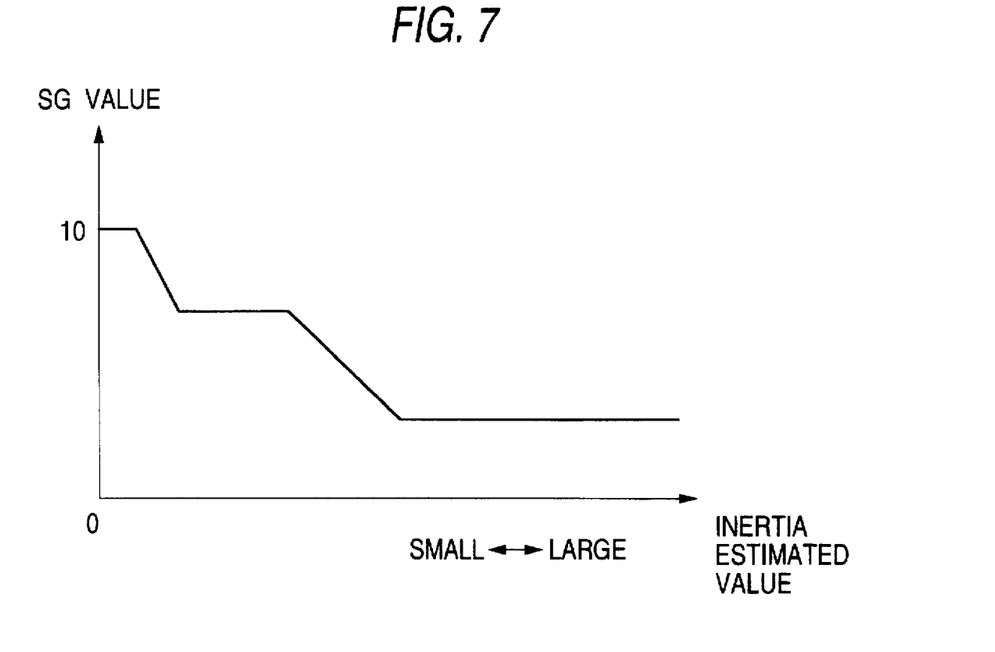
FIG. 7 is a diagram showing an example of a table of servo-gain values SG depending on an inertia estimated value.

In a process of determining the three gains, i.e., the position control gain PG, the velocity control gain VG, and the integral gain VI, a position damping coefficient $\xi_p$ and a velocity damping coefficient $\xi_v$, are fixed, and a servo-gain SG which indicates the responsiveness of the servomechanism is adjusted. When the servo-gain SG is once determined, the three gains (the position control gain PG, the velocity control gain VG, and the integral gain VI) can be obtained based on the fixed damping ratios $\xi_p$ and $\xi_v$. For an object in which the load inertia J is varied in a wide range, e.g., 1,000 times as large as the rotor inertia, there exists an optimum value suitable for the load. Accordingly, a servo-gain SG is obtained by using the estimated load inertia value obtained in the step A and referring to a table of inertia estimated values and servo-gain SG values (FIG. 7) which is previously obtained by experiments. From the obtained value of the servo-gain SG, the three gains (the position control gain PG, the velocity control gain VG, and the integral gain VI) are automatically calculated.

Fine Adjustment of the Gain in a Test Operation (Step C)

In a case where, after the adjustment in step B, the positioning time period is to be further shortened, the adjustment can be realized by an adjustment of only one parameter. Specifically, the parameter (servo-gain) SG, indicating the system responsiveness, is used. When considering position control band [Hz] of FIG. 1 in the case where the integrator is not used, the following approximation is valid if it is assumed from FIG. 1 that the velocity control band [Hz] is high relative to the position control band [Hz]:

$$PG/(2\pi \cdot SG) = 1 \quad (8)$$

Therefore, the position control gain PG is obtained as follows:

$$PG = 2\pi \cdot SG \quad (9)$$

Figure 8:
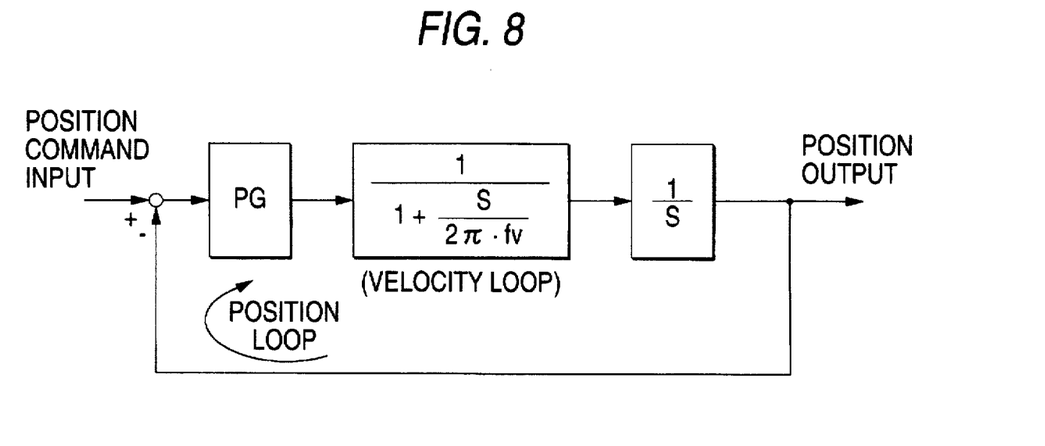
FIG. 8 is a block diagram showing relationships between the position control system and the velocity control system.

The relationships between the position control system and the velocity control system are shown in FIG. 8 where the velocity control band is $f_v$ [Hz]. An exact position input/output transfer function Gp(s) is obtained as follows:

$$Gp(s) = \frac{2\pi \cdot f_v \cdot PG}{s^2 + 2\pi \cdot f_v s + 2\pi \cdot f_v \cdot PG} \quad (10)$$

When the position damping coefficient is designated by $\xi_p$, Expression 10 can be regarded as a second order system in standard form. Expressions 9 and 10 can be combined to yield:

$$PG = \pi \cdot f_v/(2\xi_p^2) \quad (11)$$

The velocity control band $f_v$ is expressed from the Expressions 9 and 11 as follows:

$$f_v = 4\xi_p^2 \cdot SG \quad (12)$$

Figure 9:
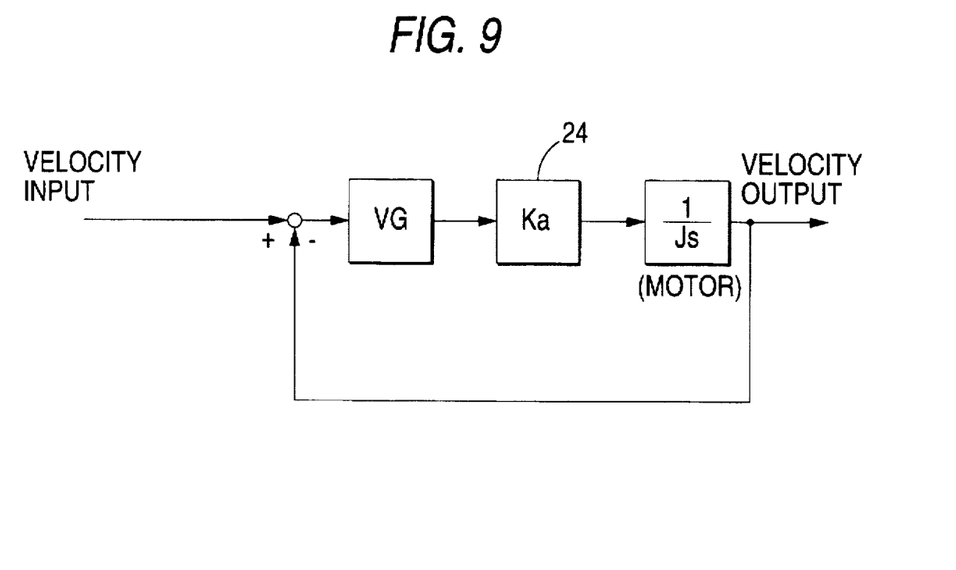
FIG. 9 is a block diagram showing a velocity proportional control system.

In FIG. 8 showing the relationships between the position loop system and the velocity loop system, the calculation of the velocity loop band is considered by using FIG. 9 showing a velocity proportional control system.

$$VG \cdot Ka/(J \cdot s) = 1 \quad (13)$$

Expression 14 is held from Expression 13 as follows:

$$f_v = (VG \cdot Ka)/(2\pi \cdot J) \quad (14)$$

From Expressions 12 and 14, the following Expression 15 is obtained.

$$VG = \frac{8\pi \cdot \xi_p^2 \cdot J \cdot SG}{Ka} \quad (15)$$

The result of step A can be used for the load inertia J, and the gain Ka of the amplifier 24 is previously known. When the servo-gain SG and the position damping coefficient $\xi_p$ are determined, therefore, the velocity control gain VG is determined.

Figure 10:
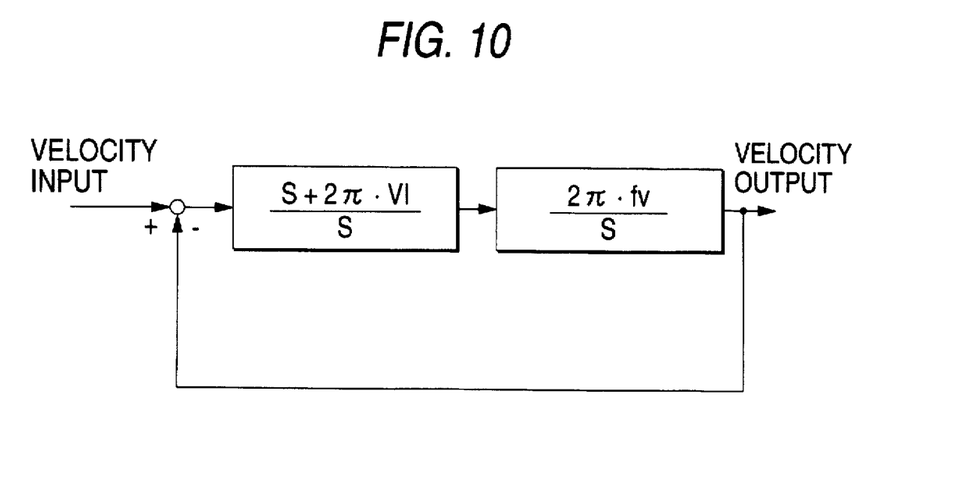
FIG. 10 is a block diagram showing a velocity PI control system.

The velocity loop including the integral gain VI is represented in FIG. 10. The input-output transfer characteristic, Gv(s), is obtained as follows:

$$Gv(s) = \frac{2\pi \cdot f_v \cdot s + 4\pi^2 \cdot VI \cdot f_v}{s^2 + 2\pi \cdot f_v \cdot s + 4\pi^2 \cdot VI \cdot f_v} \quad (16)$$

When the velocity damping coefficient is designated by $\tau_v$ and the denominator of Expression 16 is considered as a second order system in standard form, Expression 17 is obtained.

$$VI = \frac{f_v}{4\xi_v^2} \quad (17)$$

From Expressions 12 and 17, Expression 18 is obtained:

$$VI = \frac{\xi_p^2}{\xi_v^2} SG \quad (18)$$

When the servo-gain SG, the position damping coefficient $\xi_p$, and the velocity damping coefficient $\xi_v$ are once determined by Expressions 9, 15, and 18, the position control gain PG, the velocity control gain VG, and the integral gain VI are determined. Since the position damping coefficient $\xi_p$ and the velocity damping coefficient $\xi_v$ are values governing convergence of the system output when a step input command applies, they can be previously determined by simulation.

Figure 11:
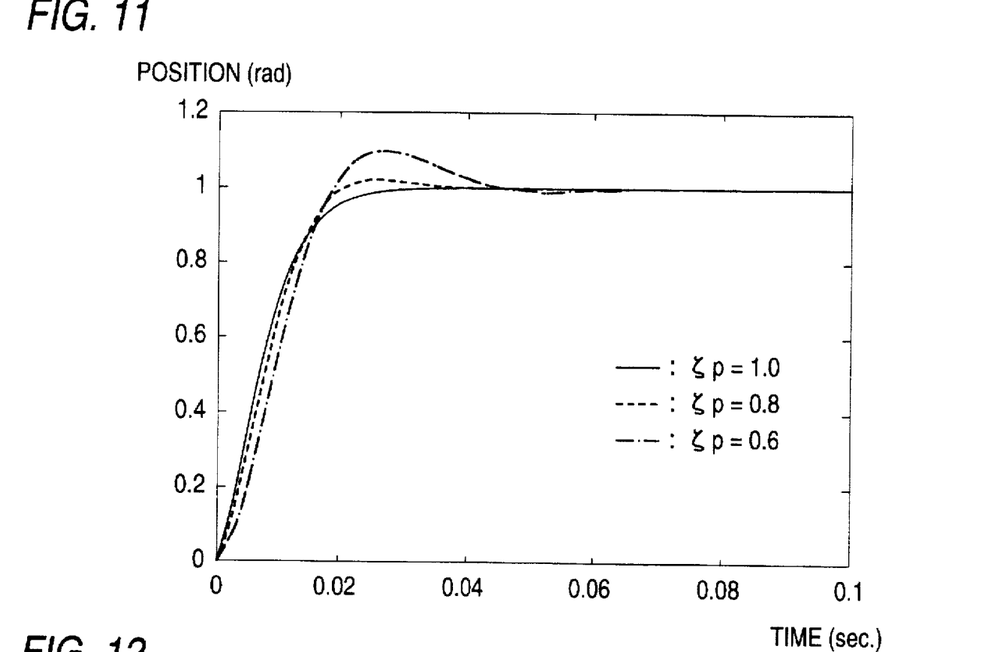
FIG. 11 is a diagram showing examples of a step response for different position damping coefficients.
Figure 12:
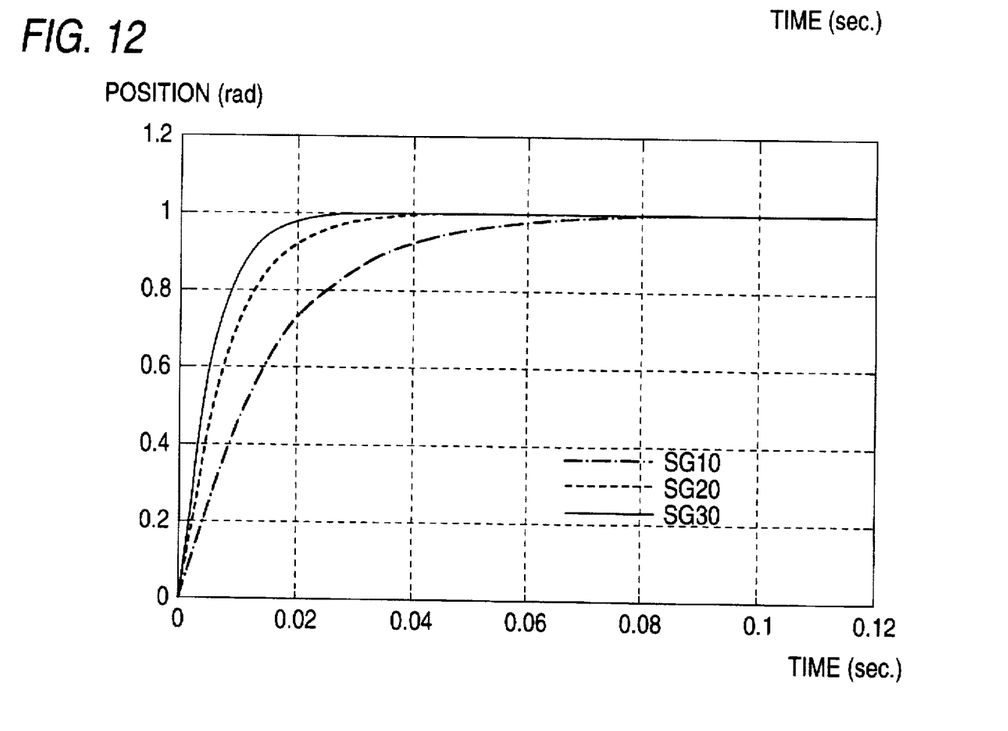
FIG. 12 is a simulation diagram of a step response in a fine adjustment after an automatic gain adjustment.

When the position damping coefficient $\xi_p$ is changed, the amount of overshoot is changed as shown in FIG. 11. FIG. 11 shows examples of the step response for different position damping coefficients $\xi_p$ (1.0, 0.8, and 0.6). In experiments, the coefficients $\xi_p$ and $\xi_v$ are fixed to 1 and 1.4, respectively, and the position control gain PG, the velocity control gain VG, and the integral gain VI can be adjusted by using only the servo-gain SG as a parameter. The step response when the servo-gain SG is changed is shown in FIG. 12. Specifically, FIG. 12 shows examples when the servo-gain SG is 10, 20, and 30. When the servo-gain SG is increased or reduced in accordance with the load inertia J, also the three gains are increased and/or reduced. The user who wishes to shorten the time period required for positioning will increase the servo-gain SG as large as possible, so that the position control gain PG, the velocity control gain VG, and the integral gain VI are automatically increased, thereby increasing the responsiveness.

In the above, the embodiment which uses the rotary motor has been described. Alternatively, the invention can be realized in the same way by using a linear motor.

Figure 13:
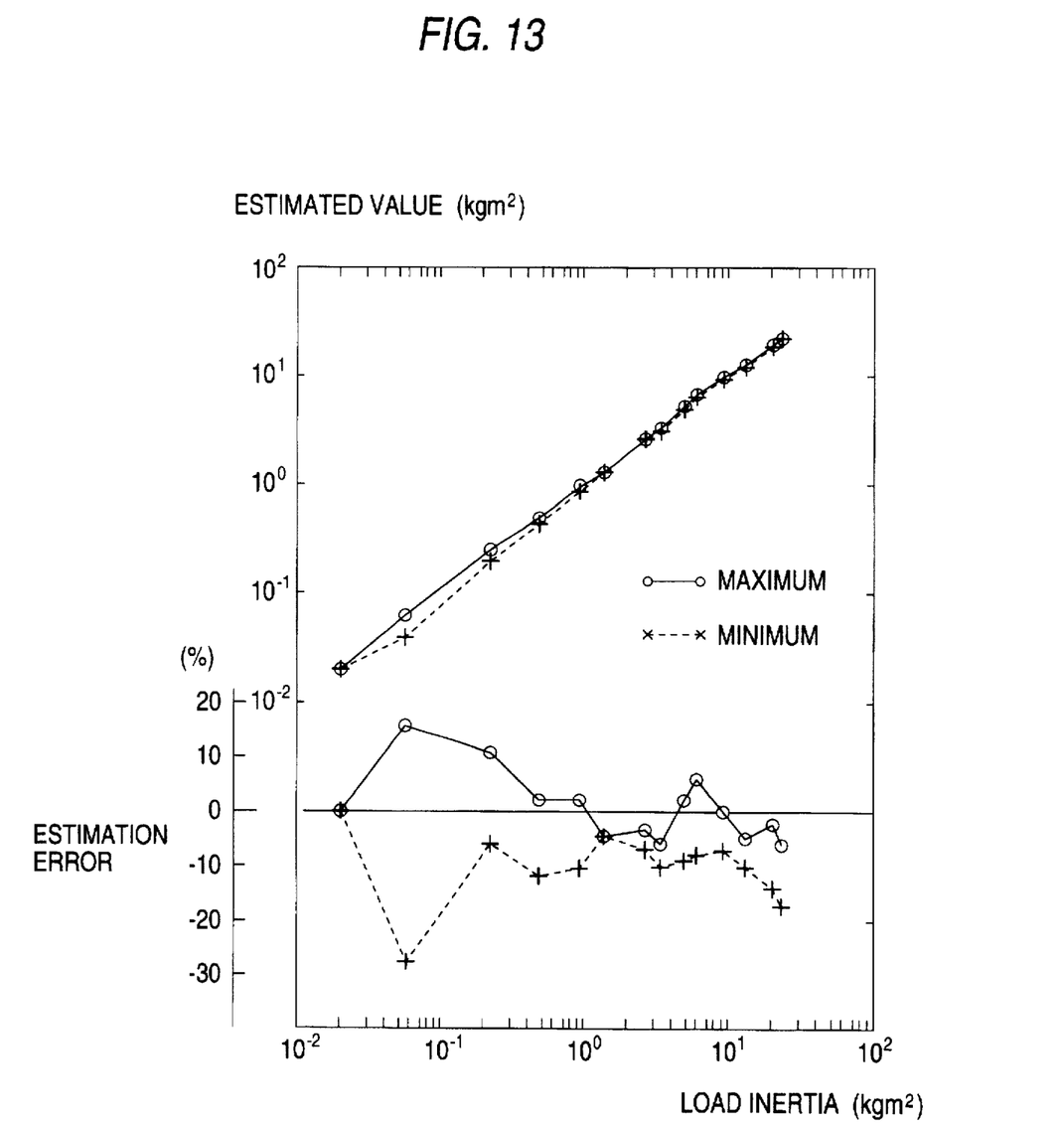
FIG. 13 is a diagram showing examples of estimation results for various kinds of inertia according to the invention.

FIG. 13 shows estimation results of the load inertia. In the figure, the maximum and minimum values of ten estimation results for the rotor inertia which is varied from the minimum value to a value 1,000 times as large as the minimum value are shown. In this range, the estimation error is within ±30%. Therefore, methods and calculations used in the invention yield accurate inertia estimates for all allowable load inertias.

Figure 14A:
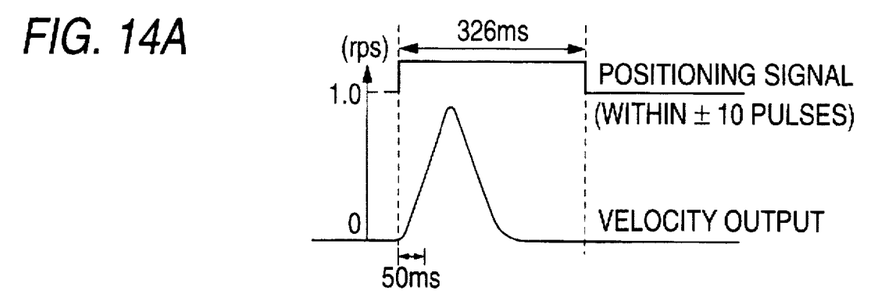
Figure 14B:
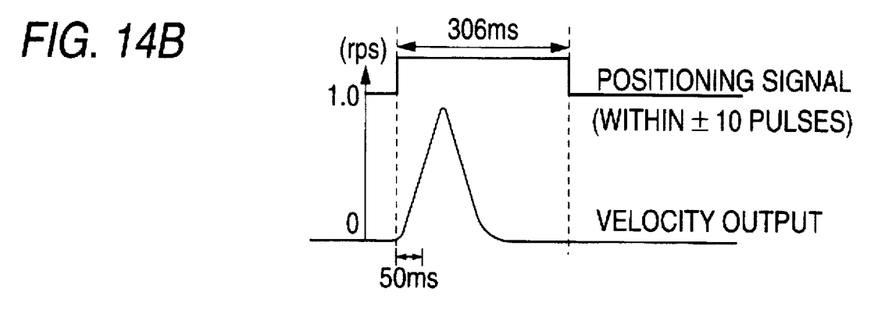
Figure 14C:
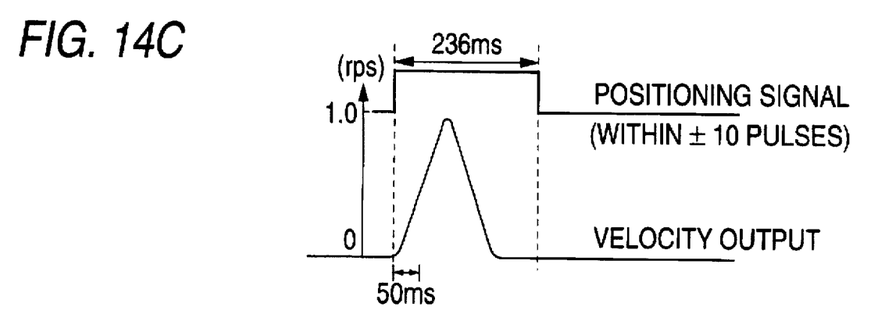

FIGS. 14A, 14B and 14C show an example of a result of positioning of 30 degrees in which the load inertia is J=0.233 kgm$^2$, in a comparative manner with a conventional result shown in FIG. 14A. As shown in FIG. 14B, after the automatic adjustment of the invention is performed, the positioning time period is shortened by about 20 milliseconds as compared with the conventional adjustment. When the fine adjustment is then performed, the positioning time period can be shortened by 70 milliseconds as a result of an adjustment of a short time period, as shown in FIG. 14C.

What is claimed is:

1. A method of automatically adjusting a gain of a servomechanism comprising a motor for performing positioning control and velocity control, the method comprising the steps of:

(a) setting a time constant and a velocity control gain of the servomechanism when a step command is supplied in a condition where the load is applied to the motor;

(b) adjusting the velocity control gain for reducing the time constant to within a predetermined range;

(c) measuring the time constant by applying step command which is adjusted according to the velocity control gain, in a condition where the load is applied to the motor;

(d) estimating a load value of the motor based on the measured time constant and the adjusted velocity control gain; and (e) setting automatically a servo-gain of the servomechanism in accordance with the estimated load value.

2. An apparatus for automatically adjusting a gain of a servomechanism driving a motor for performing positioning control and velocity control, the apparatus comprising:

a driving unit for supplying a step command to the motor in a condition where a load is applied to the motor, to thereby drive the motor;

an estimating unit for estimating the load based on a velocity output of the motor, said estimating unit comprising means for setting a time constant and a velocity control gain of the servomechanism;

means for adjusting the velocity control gain for reducing the time constant to within a predetermined range;

means for measuring the time constant by supplying the step command which is adjusted according to the velocity control gain; and means for estimating the load based on the measured time constant and the adjusted velocity control gain; and gain setting means for setting a servo-gain of the servomechanism in accordance with the estimated load.

* * * * *